(12) United States Patent
Gebreyes

(10) Patent No.: US 11,627,101 B2
(45) Date of Patent: Apr. 11, 2023

(54) COMMUNICATION FACILITATED PARTNER MATCHING PLATFORM

(71) Applicant: Thrival Tactics, LLC, Mableton, GA (US)

(72) Inventor: Yonathan Gebreyes, Mableton, GA (US)

(73) Assignee: Thrival Tactics, LLC, Mableton, GA (US)

( * ) Notice: Subject to any disclaimer, the term of this patent is extended or adjusted under 35 U.S.C. 154(b) by 0 days.

(21) Appl. No.: 17/393,686

(22) Filed: Aug. 4, 2021

(65) Prior Publication Data

US 2022/0045976 A1 Feb. 10, 2022

Related U.S. Application Data

(60) Provisional application No. 63/060,813, filed on Aug. 4, 2020.

(51) Int. Cl.
| | |
|---|---|
| *G06F 15/16* | (2006.01) |
| *H04L 51/046* | (2022.01) |
| *G06Q 50/00* | (2012.01) |
| *H04L 67/306* | (2022.01) |

(52) U.S. Cl.
CPC .......... *H04L 51/046* (2013.01); *G06Q 50/01* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 7,810,037 B1 | 10/2010 | Edwards et al. | |
| 7,827,208 B2 | 11/2010 | Bosworth et al. | |
| 10,617,949 B1 | 4/2020 | Paul | |
| 10,623,917 B1 | 4/2020 | Paul | |
| 2018/0041461 A1 | 2/2018 | Kurani | |
| 2018/0150205 A1* | 5/2018 | Rad | G06F 3/0482 |
| 2019/0043137 A1* | 2/2019 | Mathis | H04W 4/023 |

* cited by examiner

*Primary Examiner* — Wing F Chan
*Assistant Examiner* — Andrew Woo
(74) *Attorney, Agent, or Firm* — Bekiares Eliezer LLP

(57) ABSTRACT

The present disclosure relates to a communication facilitated user matching platform comprising: an account creation module comprising: an account creation interface, wherein the account creation interface is configured to receive a plurality of user inputs, and a confirmation display; a user login module, wherein the user login module is configured to receive a plurality of identification criteria; a user interface module comprising: a profile data module, and a match interface module configured to enable a first matched user and at least one second matched user to communicate, wherein the first matched user is prompted to answer at least one facilitating line provided by the second matched user; a notification module configured to notify a first matched user of at least one second matched user, the notification module comprising: a plurality of notification types, and a plurality of alerts; a security module; a matching rules module; and a computing device.

20 Claims, 9 Drawing Sheets

COMMUNICATION FACILITATED PARTNER MATCHING PLATFORM

RELATED APPLICATION

Under provisions of 35 U.S.C. § 119(e), the Applicant claims benefit of U.S. Provisional Application No. 63/060,813 filed on Aug. 4, 2020, which is incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure generally relates to Partner Matching Platforms.

BACKGROUND

In some situations, meeting new people and dating can be stressful and difficult. For example, meeting new people out at a bar, while exercising, or at social events can be awkward and lead to undesired conversation and/or rejection. Thus, the conventional strategy is to use partner matching platforms and apps to circumvent these undesired scenarios. However, this streamlined approach often causes problems because dating app success rates for finding committed relationships are, on average, less than 15%. A better way to engage and filter through undesired potential partners is needed.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

In one aspect, the present disclosure relates to a communication facilitated user matching platform comprising: an account creation module comprising: an account creation interface, wherein the account creation interface is configured to receive a plurality of user inputs, and a confirmation display; a user login module, wherein the user login module is configured to receive a plurality of identification criteria; a user interface module comprising: a profile data module, and a match interface module configured to enable a first matched user and at least one second matched user to communicate, wherein the first matched user is prompted to answer at least one facilitating line provided by the second matched user, a story mode module, and an engage mode module; a notification module configured to notify a first matched user of at least one second matched user, the notification module comprising: a plurality of notification types, and a plurality of alerts; a security module; a matching rules module; and a computing device.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
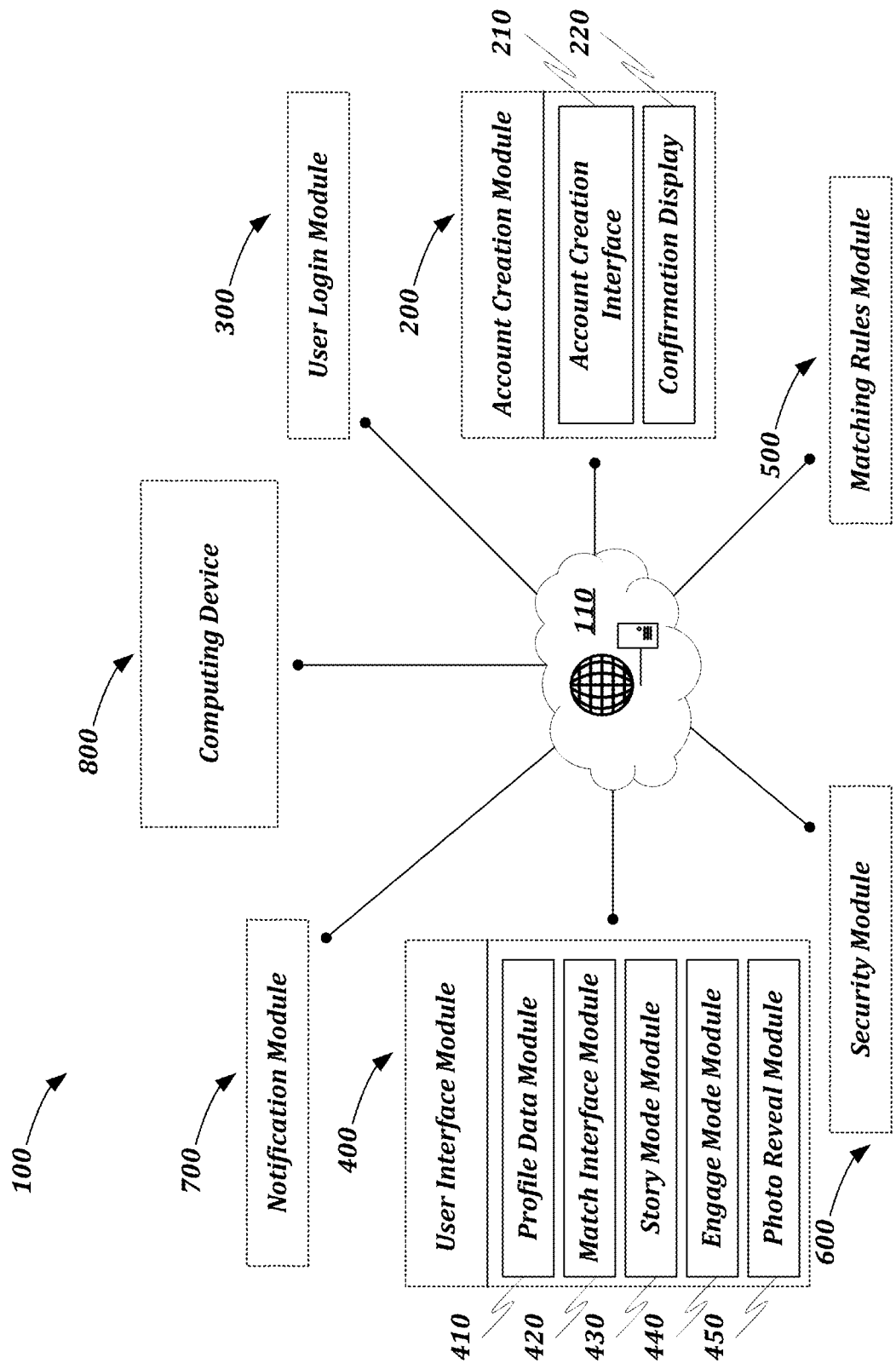
FIG. 1 illustrates a block diagram of an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of matching platforms, embodiments of the present disclosure are not limited to use only in this context.

I. Platform Overview

This overview is provided to introduce a selection of concepts in a simplified form that are further described below. This overview is not intended to identify key features or essential features of the claimed subject matter. Nor is this overview intended to be used to limit the claimed subject matter's scope.

Embodiments of the present disclosure may comprise methods, systems, and a computer readable medium comprising, but not limited to, at least one of the following:

A. An Account Creation Module;
B. A User Login Module;
C. A User Interface Module;
D. A Notification Module;
E. A Security Module;
F. A Matching Rules Module; and
G. A Computing Device.

Details with regards to each module is provided below. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each component disclosed within each module can be considered independently without the context of the other components within the same module or different modules. Each component may contain language defined in other portions of this specifications. Each component disclosed for one module may be mixed with the functionality of another module. In the present disclosure, each component can be claimed on its own and/or interchangeably with other components of other modules.

The following depicts an example of a method of a plurality of methods that may be performed by at least one of the aforementioned modules, or components thereof. Various hardware components may be used at the various stages of operations disclosed with reference to each module. For example, although methods may be described to be performed by a single computing device, it should be understood that, in some embodiments, different operations may be performed by different networked elements in operative communication with the computing device. For example, at least one computing device 800 may be employed in the performance of some or all of the stages disclosed with regard to the methods. Similarly, an apparatus may be employed in the performance of some or all of the stages of the methods. As such, the apparatus may comprise at least those architectural components as found in computing device 800.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Consistent with embodiments of the present disclosure, a method may be performed by at least one of the modules disclosed herein. The method may be embodied as, for example, but not limited to, computer instructions, which when executed, perform the method. The method may comprise the following stages:

Providing a profile creation interface;
Providing a plurality of requested user inputs, wherein the inputs comprise at least one of the following:
  a name,
  a username,
  an age,
  a location,
  an email address,
  an identification verification,
  a 2-step verification,
  a password,
  a photo,
  a questionnaire, and
  a gender;
Verifying the user inputs;
Sending a confirmation link to the email address;
Selecting the confirmation link;
Displaying a confirmation display;
Determining profile data for a first user;
Processing the profile data based on matching rules, the matching rules being configured to determine a likelihood of matching parameters among a plurality of users;
  (Alternate) Processing the profile data based on a predetermined criteria being configured to determine a likelihood of matching parameter among a plurality of users;
  (Alternate) Searching for a first user and a second user on a communication facilitated partner matching platform;
  Wherein the searching comprises comparing a plurality of user partner preferences;
  (Alternate) Wherein the searching comprises comparing a plurality of user matching preferences;
  (Alternate) Wherein the searching comprises comparing a plurality of user matching preferences based on a predetermined criteria;
Determining at least one second user with parameters matching to the first user;
  (Alternate) Determining at least one second user with preferences matching to the first user;
Notifying the first user of the at least one second user;
Allowing communication between the first user and the at least one second user;
Providing the first user with a list of facilitating lines from a second user;
Providing the second user with a list of facilitating lines from a first user;
Prompting the first user to communicate with the second user,
  wherein the first user communicates via answering at least one facilitating line of the second user;
Revealing a portion of a picture of the second user in response to answering the at least one facilitating line;
  (Alternate) Revealing a layer of a picture of the second user in response to answering the at least one facilitating line;
  (Alternate) Revealing a portion of a profile of the second user in response to answering the at least one facilitating line;
  (Alternate) Revealing a portion of personal information of the second user in response to answering the at least one facilitating line;
  (Alternate) Revealing a portion of a picture of the second user in response to the second user selecting a portion of the picture to reveal.

Although the aforementioned method has been described to be performed by the Conversation Facilitation Matching Platform 100, it should be understood that computing device 800 may be used to perform the various stages of the method. Furthermore, in some embodiments, different operations may be performed by different networked elements in operative communication with computing device 800. For example, a plurality of computing devices may be employed in the performance of some or all of the stages in the aforementioned method. Moreover, a plurality of computing devices may be configured much like a single computing device 800. Similarly, an apparatus may be employed in the performance of some or all stages in the method. The apparatus may also be configured much like computing device 800.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. Platform Configuration

FIG. 1 illustrates one possible operating environment through which a platform consistent with embodiments of the present disclosure may be provided. By way of non-limiting example, the Conversation Facilitation Matching Platform 100 may be hosted on, for example, a cloud computing service. In some embodiments, the platform 100 may be hosted on centralized server 110, such as, for example, a cloud computing service. A user may access platform 100 through a software application and/or hardware device. The software application may be embodied as, for example, but not be limited to, a website, a web application, a desktop application, and a mobile application compatible with the computing device 800. One possible embodiment of the software application and/or hardware device may be provided by the Thrival Tactics suite of products and services provided by Thrival Tactics, LLC.

Accordingly, embodiments of the present disclosure provide a software and hardware platform comprised of a distributed set of computing elements, including, but not limited to:

A. Account Creation Module

FIG. 1 illustrates account creation module 200 consistent with embodiments of the present disclosure. In some embodiments, the account creation module may comprise an account creation interface. In further embodiments, the account creation module may comprise a confirmation display. The account creation module 200 may refer to hardware and/or software configured to perform operations described herein (including such operations as may be incorporated by reference) for creating a user account.

1. Account Creation Interface

An account creation interface 210 may be provided. In some embodiments, the account creation interface may comprise a plurality of user input requests. The plurality of user input requests may comprise at least one of the following: a name, a biometric identification, a username, a user image, an age, a location, a date of birth, an email address, a password, a 2-step verification, an identity verification, a human verification, and/or an identification card scan. In some embodiments, the plurality of user input requests may be automatically filled via approval of at least one third-party platform. The plurality of user input requests may be used for creating a user profile.

In further embodiments, the account creation module may comprise a questionnaire. The questionnaire may be used to assist in associating a user with a plurality of other users.

2. Confirmation Display

A confirmation display 220 may be provided. The confirmation display may be used as a result of the user successfully completing the plurality of inputs and/or the questionnaire. In some embodiments, the confirmation display may cause platform 100 to send a confirmation link. The confirmation link may be used to associate the email address to the user. The confirmation link may be further used to verify identification of the user.

B. User Login Module

FIG. 1 illustrates user login module 300 consistent with embodiments of the present disclosure. In some embodiments, the user login module may comprise a plurality of identification criteria. The plurality of identification criteria may comprise at least one of the plurality of user input requests. The plurality of identification criteria may be used to prompt the user to enter at least one input to securely log in. The user login module 300 may refer to hardware and/or software configured to perform operations described herein (including such operations as may be incorporated by reference) for allowing a user to login to the Conversation Facilitation Matching Platform 100.

C. User Interface Module

FIG. 1 illustrates user interface module 400 consistent with embodiments of the present disclosure. In some embodiments, the user interface module may comprise a profile data module. In further embodiments, the user interface module may comprise a match interface module. In even further embodiments, the user interface module may comprise a story mode module. In yet further embodiments, the user interface module may comprise an engage mode module. The user interface module 400 may refer to hardware and/or software configured to perform operations described herein (including such operations as may be incorporated by reference) for allowing a user to interact with the Conversation Facilitation Matching Platform 100.

1. Profile Data Module

A profile data module 410 may be provided. In some embodiments, the profile data module may comprise a user information module. The user information module may be used to store, access, display, and modify the information provided from the plurality of user input requests and/or information comprised in the login module.

Figure 6:
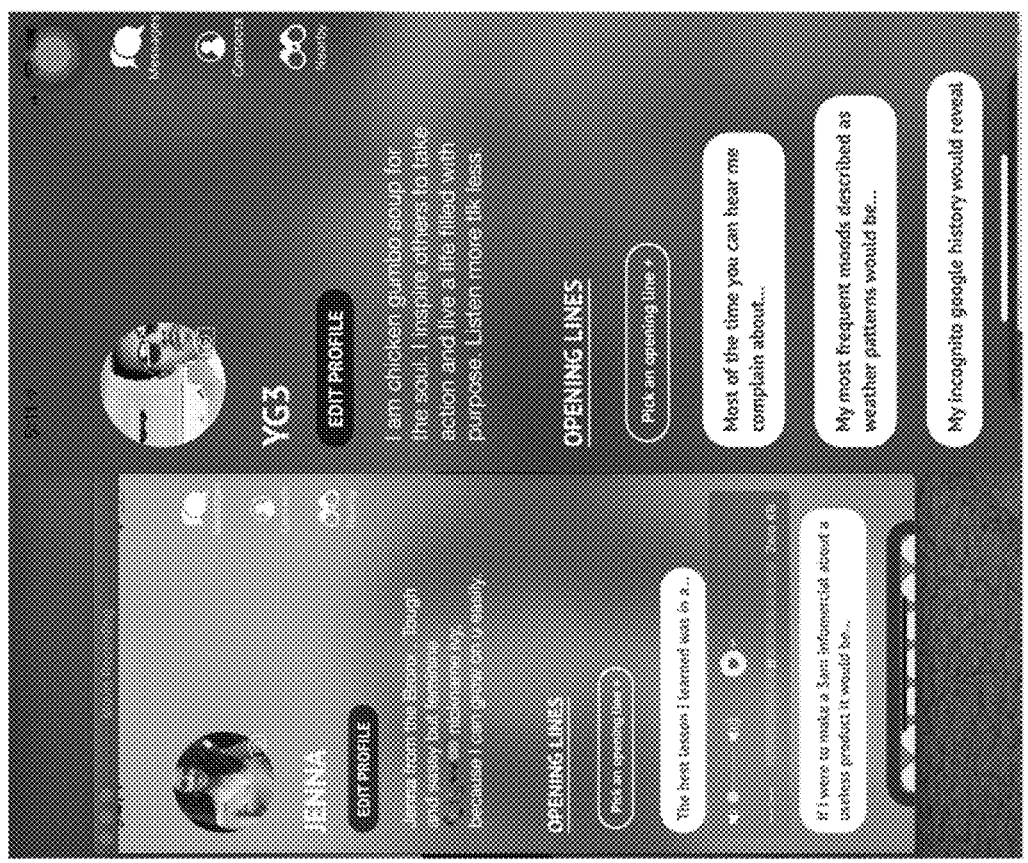
FIG. 6 is a screenshot of the platform of FIG. 1 consistent with the present disclosure.

In some embodiments, the profile data module may comprise partner specification module. In some embodiments, the partner specification module may comprise a geographical range input. The geographical range input may be used to limit a distance match with other users. In certain embodiments, the partner specification module may comprise an age range input. The age range input may be used to specify a preferred minimum and/or maximum age to match with other users. In some embodiments, the partner specification module may comprise a gender preference input. The gender preference input may be used to specify preferred gender to match with other users. In some embodiments, the partner specification module may comprise at least one facilitating line input. In some embodiments, as shown in FIG. 6, the at least one facilitating line input may comprise a library of facilitating lines. The library of facilitating lines may be used to populate the at least one facilitating line input. In some embodiments, the facilitating line input may comprise a custom facilitating line option. The custom facilitating line option may be used for a user to create a unique facilitating line. In some embodiments, the facilitating line input may be configured to create at least one facilitating line from the facilitating line input. The at least one facilitating line may be used to guide conversations. Alternatively or additionally, the at least one facilitating line may be used to engage in meaningful dialog.

The partner specification module may comprise a user interests and/or hobbies input. The user interests and/or hobbies input may be used to match with other users having similar hobbies and/or interests.

2. Match Interface Module

A match interface module 420 may be provided. In some embodiments, the match interface module may comprise a messaging module. The messaging module may be used for communication from a first user to a second user. The messaging module may be further used for communication for a plurality of matched users. In some embodiments, the messaging module may be configured to prompt the first user to answer at least one facilitating line of the second user. In some embodiments, the messaging module may be configured to prompt the second user to answer at least one facilitating line of the first user. In some embodiments, the messaging module may be configured to prompt the matched users to answer their opposing user's facilitating line. In some embodiment, the at least one facilitating line may be collected from the at least one facilitating line input. In some embodiments, at least one first matched user may provide the at least one facilitating line to at least one second matched user. The at least one first matched user may provide the at least one facilitating line to begin a conversation and/or to facilitate a meaningful dialogue between the at least one first matched user and the at least one second matched user.

Figure 7:
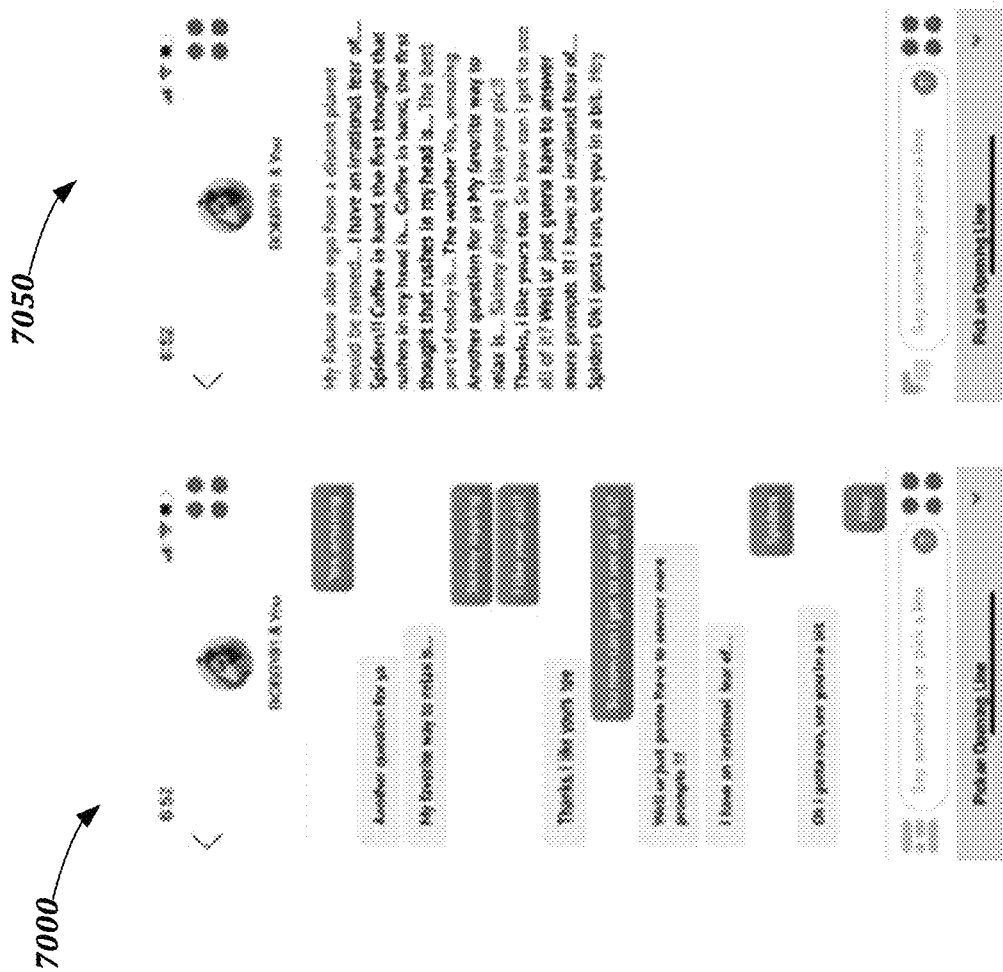
FIG. 7 is a screenshot of the platform of FIG. 1 consistent with the present disclosure.

As shown in FIG. 7, the match interface module may allow a user to view messages between themselves and a matched user. In some embodiments, the match interface module may present the messages in a traditional text message style, (as shown at 7000) such that each message is displayed individually, with messages sent by the user displayed on a right-hand side of the screen and messages received by the user displayed on a left-had side of the screen. Alternatively, the messages may be displayed in a paragraph style (as shown at 7050), such that the messages are displayed as a single block of text. The messages may be color coded to aid in identifying whether a particular portion of the block of text was sent by the user or received by the user. In some embodiments, the user may select between the traditional text message style, and the paragraph style.

In some embodiments, the match interface module may comprise a topic module. The topic module may be used to display similar user interests and/or hobbies among a first user and a second user and/or the matched users. In some embodiments, the user interests and/or hobbies may be collected from the user interests and/or hobbies input.

In some embodiments, the match interface module may comprise a supplemental information module. In some embodiments, the supplemental information module may comprise relevant tips, articles, pictures and/or information specific to the user's common interests. In some embodiments, the supplemental information module may comprise relevant tips, articles, pictures and/or information specific to the user's conversations.

Figure 4:
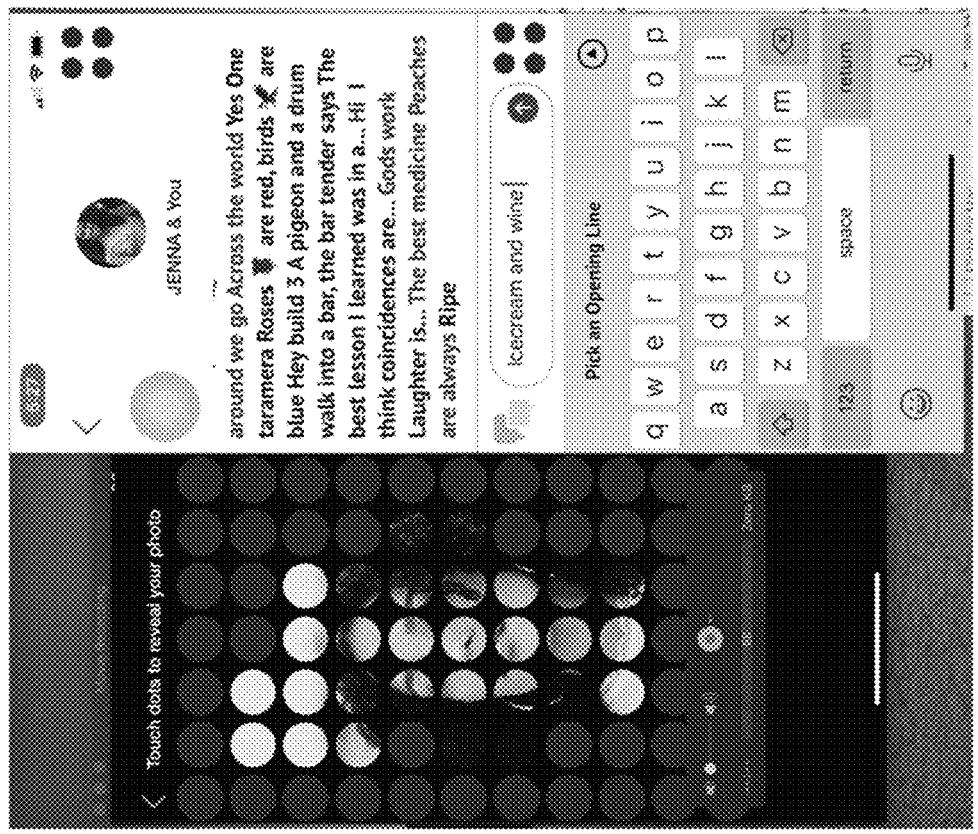
FIG. 4 is a screenshot of the platform of FIG. 1 consistent with the present disclosure.

In some embodiments, the match interface module may comprise a profile and messaging restriction module. The profile and messaging restriction module may comprise a matched user's communication restriction. The matched user's communication restriction may be used by allowing two-way communication upon a predetermined party initiating the conversation. Alternatively or additionally, the matched user's communication restriction may be used by allowing message transmission only by answering at least one facilitating line. The profile and messaging restriction module may comprise a user profile restriction. The user profile restriction may be used to allow a first matched user to view the second matched user profile upon an approval of the second matched user. The user profile restriction may be used to allow a first matched user to view a portion of the second matched user profile upon the approval of the second matched user. The user profile restriction may be used to allow a first matched user to view a portion of the second matched user profile upon the first user meeting a set of criteria. By way of nonlimiting example, the second matched user's picture may be incrementally revealed and/or revealed in segments upon the progression of facilitating lines answered by the first matched user, as shown in FIG. 4. By way of another nonlimiting example, the second matched user's picture and/or the first matched user's picture may be incrementally revealed and/or revealed in segments upon predetermined increments of time passing while both users communicate via the messaging module.

3. Story Mode Module

Figure 5:
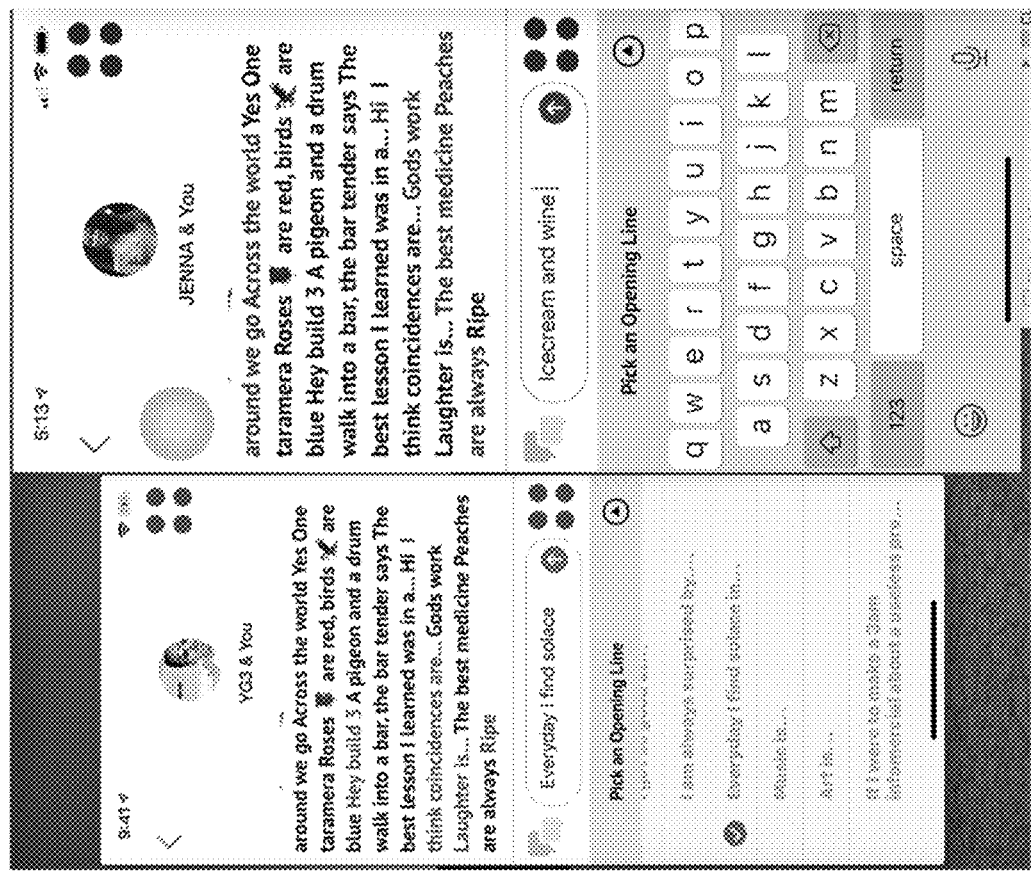
FIG. 5 is a screenshot of the platform of FIG. 1 consistent with the present disclosure.

A story mode module 430 may be provided. In some embodiments, the story mode module may be configured to be viewed on the profile data module. In some embodiments, the story mode module may be configured to use a plurality of facilitating lines answered by the matched users to compile, build and/or connect together to create a story, as shown in FIG. 5. In some embodiments, the story mode module may be configured to provide an incomplete sentence or an incomplete phrase. In some embodiments, the story mode module may prompt the plurality of users to complete the incomplete sentence or the incomplete phrase. In some embodiments, the story mode module may compile, build and/or connect together a plurality of completed sentences and/or phrases to create a story.

4. Engage Mode Module

Figure 3:
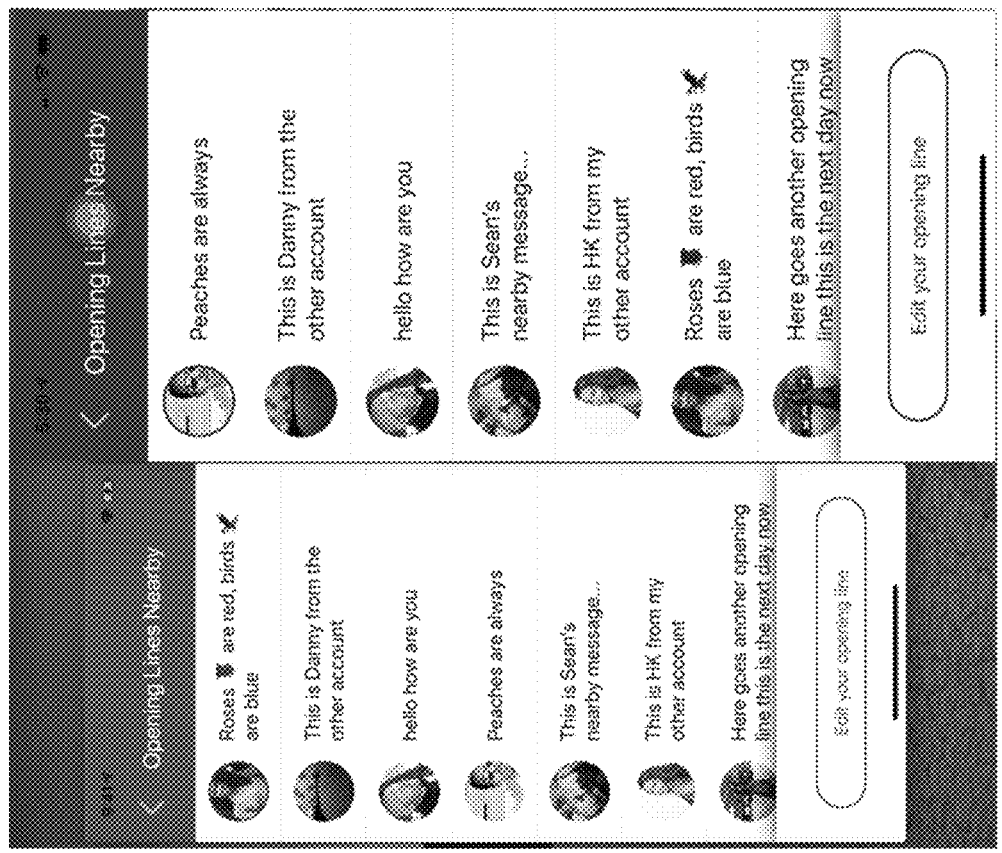
FIG. 3 is a screenshot of the platform of FIG. 1 consistent with the present disclosure.

An engage mode module 440 may be provided. In some embodiments, as shown in FIG. 3, the engage mode module may comprise a list of the plurality of users. In some embodiments, the list of the plurality of users may comprise the at least one facilitating line corresponding to a respective user. The at least one facilitating line corresponding to a respective user may be used for other users to view the available facilitating lines to answer. In some embodiments, the engage mode module may be configured to allow at least one user to communicate with one or more of the plurality of users. The engage mode module configured to allow at least one user to communicate with one or more of the plurality of users may be used to allow communication with, for example other users (from among the plurality of users) with similar parameters, and/or in the same geographic area. In some embodiments, the engage mode module may be configured to restrict initial communication between users by way of answering the at least one facilitating lines.

5. Photo Reveal Module

A photo reveal module 450 may be provided. In some embodiments, the photo reveal module may comprise a photo of the user. The photo may be divided into a plurality of regions. The user may permit a matched user to view the photo on a per-region basis. For example, the user may determine, based on a received message or response to a facilitating line to reveal one or more of the plurality of regions. Responsive to a user revealing one or more portions of a photo to a matched user, the one or more revealed regions may be displayed to the matched user, while unrevealed regions remain hidden. In some embodiments, hidden regions may be displayed as blurred or obscured by an overlay (e.g., one or more dots). In some embodiments, each of the one or more revealed regions may remain hidden until the matched user interacts with (e.g., clicks on, taps, etc.) the region.

D. Notification Module

FIG. 1 illustrates user notification module 700 consistent with embodiments of the present disclosure. The notification module 700 may refer to hardware and/or software configured to perform operations described herein (including such operations as may be incorporated by reference) for displaying or otherwise providing one or more notifications to a user. In some embodiments, the notification module may comprise a plurality of notification types. In some embodiments, the plurality of notification types may comprise at least one push notification. The push notification may be used to display a notification as a text message sent to the user. In some embodiments, the plurality of notification types may comprise a banner. The banner may be used display a notification for a short time on the screen and disappear after. In some embodiments, the plurality of notification types may comprise an in-app alert. The in-app alert may be used to display a notification via pop up window on the platform and require action from the user to open or close the in-app alert. In some embodiments, the plurality of notification types may comprise a badge. The badge may be used to display a notification via a small indicator, such as one or more circles, located on the corner of the platform icon. In some embodiments, the plurality of notification types may comprise an audible alert. The audible alert may be used to inform the user of a notification.

In some embodiments, the notification module may comprise a plurality of alerts. In some embodiments, the plurality of alerts may comprise a match alert. The match alert may be used to notify a user of a match with another user. In some embodiments, the plurality of alerts may comprise a new message alert. The new message alert may be used to notify the user of a new message from another user. In some embodiments, the plurality of alerts may comprise a profile update alert. The profile update alert may be used to inform the user of a profile update request and/or requirement. In some embodiments, the plurality of alerts may comprise a platform update alert. The platform update alert may be used to inform the user of a platform update request and/or requirement. In some embodiments, the plurality of alerts may comprise an image reveal alert. The image reveal alert may be used to notify a user of another user's revelation of their image.

E. Security Module

FIG. 1 illustrates user security module 600 consistent with embodiments of the present disclosure. The user security module 600 may refer to hardware and/or software configured to perform operations described herein (including such operations as may be incorporated by reference) for restricting particular interactions between users of the Conversation Facilitation Matching Platform 100. The security module may be used for at least one of the following:

a. enforcing restrictions,
    b. removing and/or restricting users,
    c. restricting and/or Removing content,
    d. resetting and/or changing user passwords,
    e. limiting and/or removing personal user data, and/or f. restricting communication and/or profile access of the first user to the second user.

F. Matching Rules Module

FIG. 1 illustrates matching rules module 500 consistent with embodiments of the present disclosure. The matching rules module 500 may refer to hardware and/or software configured to perform operations described herein (including such operations as may be incorporated by reference) for determining a match between a first user and a second user of the Conversation Facilitation Matching Platform 100. In some embodiments, the matching rules module may comprise a plurality of matching rules. In some embodiments, the matching rules may be based on one or more predetermined criteria. In some embodiments, the matching rules may be configured to compare data from the partner specification module from a plurality of users. In some embodiments, the matching rules may determine a likelihood of matching criteria among a plurality of users. The matching rules may be used to search for similarities of data from the partner specification modules of a plurality of users in order to create a match between the first user and the second user.

In some embodiments, the matching rules module may comprise a match creation module. In some embodiments, the match creation module may notify a plurality of matched users via the notification module. In further embodiments, the match creation module may enable the plurality of matched users to communicate via the match interface module. In yet further embodiments, the match creation module may enable the plurality of matched users to view at least one of the elements in the other user's profile data module.

III. Platform Operation

Embodiments of the present disclosure provide a hardware and software platform operative by a set of methods and computer-readable media comprising instructions configured to operate the aforementioned modules and computing elements in accordance with the methods. The following depicts an example of at least one method of a plurality of methods that may be performed by at least one of the aforementioned modules. Various hardware components may be used at the various stages of operations disclosed with reference to each module.

For example, although methods may be described to be performed by a single computing device, it should be understood that, in some embodiments, different operations may be performed by different networked elements in operative communication with the computing device. For example, at least one computing device 800 may be employed in the performance of some or all of the stages disclosed with regard to the methods. Similarly, an apparatus may be employed in the performance of some or all of the stages of the methods. As such, the apparatus may comprise at least those architectural components as found in computing device 800.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

A. Method for Matching Users

Figure 8:
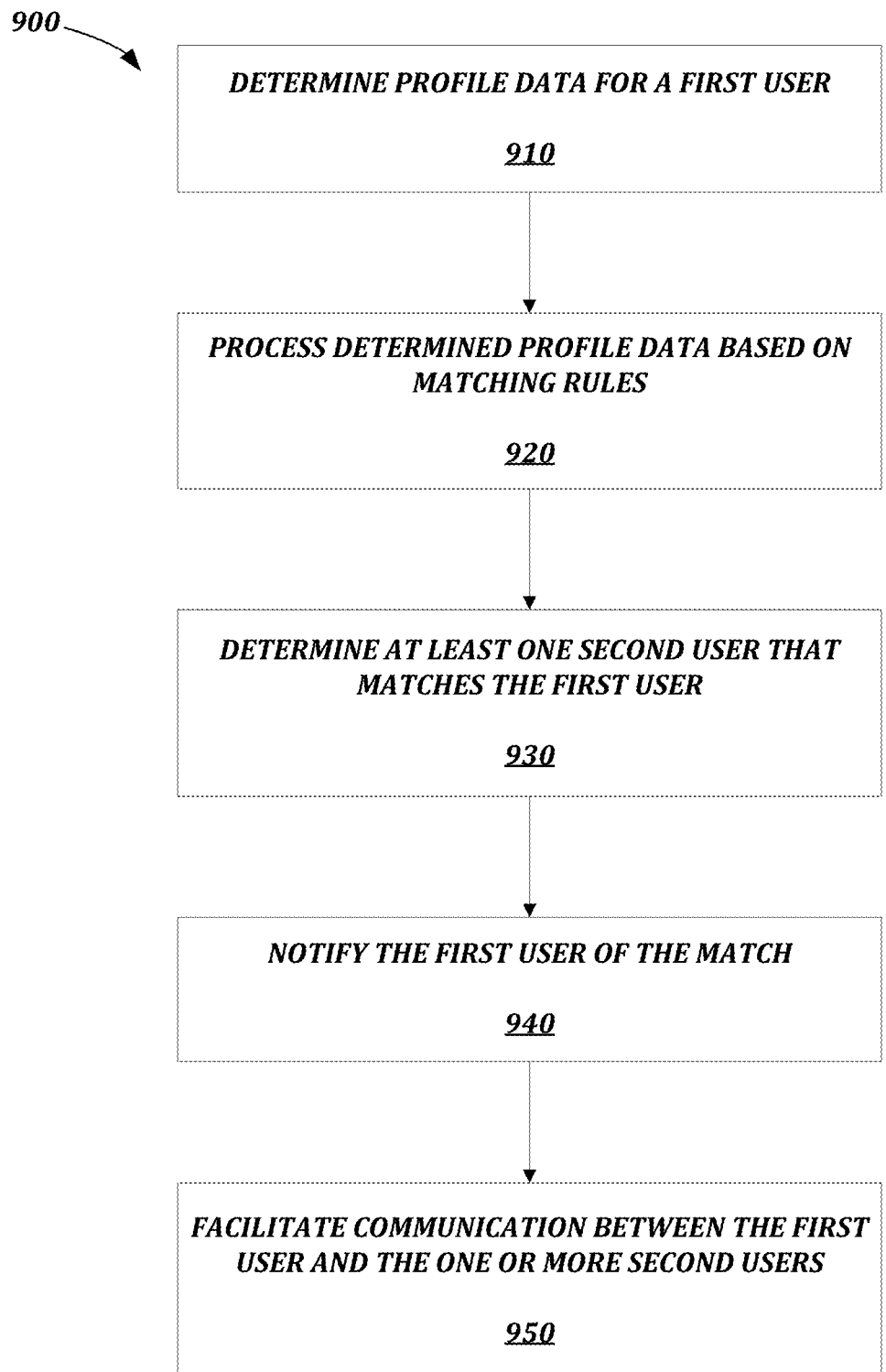
FIG. 8 is a flowchart of a method for matching users of a Conversation Facilitation Matching Platform that uses the operating environment of FIG. 1.

FIG. 8 is a flow chart setting forth the general stages involved in a method 900 consistent with an embodiment of the disclosure for matching users of the Conversation Facilitation Matching Platform 100. Consistent with embodiments of the present disclosure, the method 900 may be performed by at least one of the aforementioned modules. The method 900 may be embodied as, for example, but not limited to, computer instructions, which when executed, perform the method.

Although method 900 has been described to be performed by the Conversation Facilitation Matching Platform 100, it should be understood that computing device 800 may be used to perform the various stages of method 900. Furthermore, in some embodiments, different operations may be performed by different networked elements in operative communication with computing device 800.

Method 900 may begin at starting block 905 and proceed to stage 910, where the platform may determine profile data for a first user. For example, the profile data may be received at one or more modules (e.g., the profile data module of the user interface module 400). In embodiments, the profile data may be stored on the platform (e.g., at the centralized server 110). The profile data may include, as non-limiting examples, demographic data (e.g., age, gender identity, etc.), physical characteristic data (e.g., height, hair color, etc.), and/or data indicating one more user interests or hobbies. There are many kinds of data that may be stored as profile data for the first user.

After receiving the profile data for the first user in stage 910, the method 900 may proceed to stage 920, where the platform processes the received profile data based on one or more matching rules. For example, processing the received profile data may comprise a matching rules module (e.g., matching rules module 500) processing the profile data for the first user based on a set of criteria to determine a likelihood that a matching parameter exists among a plurality of users including the first user. In some embodiments, the set of criteria may be a predetermined set. In other embodiments, the set of criteria may be determined based on factors such as, the users selected in the plurality of users.

As another example, processing the received profile data may comprise a matching rules module (e.g., matching rules module 500) searching for one or more second users on the platform, (e.g., the communication facilitated partner matching platform 100) who match the first user. In some embodiments, a second user may be determined to match the first user in response to one or more profile properties of the second user matching one or more user partner preferences established by the first user. In some embodiments, a second user may be determined to match the first user in response to one or more profile properties of the second user matching one or more user partner preferences established by the first user and one or more profile properties of the first user matching one or more user partner preferences established by the second user. In still other embodiments, a second user may be determined to match the first user in response to comparing a plurality of user matching preferences from the first user and the second user based on a set of predetermined criteria.

In stage 930, the platform may determine that at least one second user matches the first user. For example, a module (e.g., the matching rules module 500) may determine a set of one or more second users that match the first user. For example, in some embodiments, the module may determine that at least one second user has one or more profile parameters that match the partner preferences of the first user and/or that the first user has one or more profile parameters that match the partner preferences of the second user.

After determining that at least one second user matches the first user in stage 930, the method 900 may proceed to stage 940, where the platform may notify at least the first user of the match. For example, a module (e.g., the notification module 700) may notify the first user of the match between the first user and the one or more second users. In some embodiments, the module may notify the one or more second users of the match. Notifying a user may comprise, for example, transmitting a short messaging service (SMS) message to a device associated with the user, displaying a banner notification on a device associated with the user, displaying an in-app notification on the device associated with the user, displaying a badge notification on the device associated with the user, and/or causing the device associated with the user to present an audible alert.

After notifying the first user of the match at stage 940, the method 900 may proceed to stage 950, where the platform facilitates communication between the first user and at least one of the one or more second users. For example, the platform may include a module (e.g., the match interface module of the user interface module 400) that allows the first user to initiate a text conversation with the second user. In some embodiments, initiating the text conversation may include, for example, the first user selecting one or more facilitating lines for facilitating a conversation between the first user and the second user. In some embodiments, the user may transmit a message directly to the second user. The second user may receive a notification of the message and/or contents of the message.

B. Method for Facilitating Communication

Figure 9:
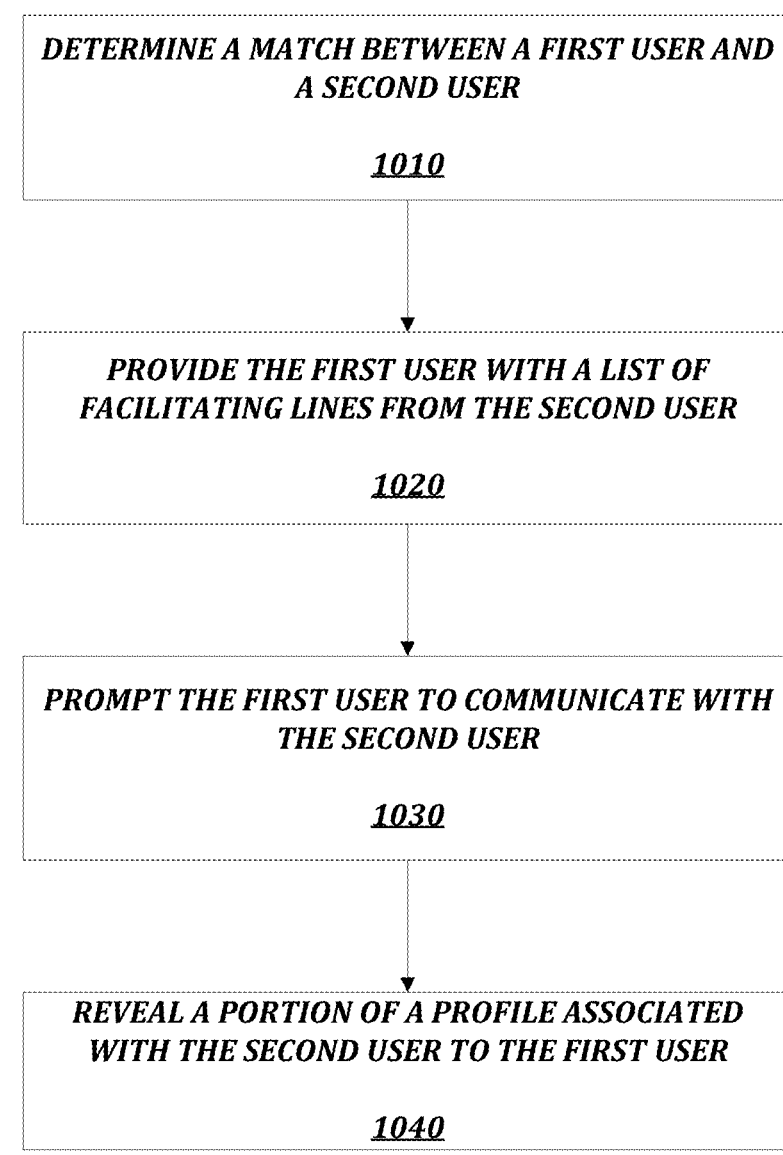
FIG. 9 is a flowchart of a method for facilitating communication between users of a Conversation Facilitation Matching Platform that uses the operating environment of FIG. 1.

FIG. 9 is a flow chart setting forth the general stages involved in a method 1000 consistent with an embodiment of the disclosure for facilitating communication between users of the Conversation Facilitation Matching Platform 100. Consistent with embodiments of the present disclosure, a method may be performed by at least one of the aforementioned modules. The method may be embodied as, for example, but not limited to, computer instructions, which when executed, perform the method.

Although method 1000 has been described to be performed by the Conversation Facilitation Matching Platform 100, it should be understood that computing device 800 may be used to perform the various stages of method 1000. Furthermore, in some embodiments, different operations may be performed by different networked elements in operative communication with computing device 800.

Method 1000 may begin at starting block 1005 and proceed to stage 1010, where the platform may determine a match between a first user and a second user. For example, the platform may include one or more modules (e.g., matching rules module 500) that may determine that a match exists between a first user and a second user. In some embodiments, determining a match exists may comprise determining that the second user has one or more profile parameters that match partner preferences of the first user and/or that the first user has one or more profile parameters that match partner preferences of the second user.

After determining a match between the first user and the second user in stage 1010, the method 1000 may proceed to stage 1020, where the platform may provide the first user with a list of one or more facilitating lines from the second user. For example, the second user may store one or more pre-populated facilitating lines and/or one or more facilitating lines customized for the first user. In embodiments, the facilitating lines may comprise, greetings, questions, and/or incomplete sentences or phrases.

A module (e.g., the match interface module of the user interface module 400) may retrieve one or more of the facilitating lines stored by the second user. The module may present the one or more retrieved second user facilitating lines to the first user. In some embodiments, the module may also retrieve one or more facilitating lines stored by the first user, and may present the retrieved first user facilitating lines to the second user.

After presenting the one or more facilitating lines to the first user in stage 1020, the platform may prompt the first user to communicate with the second user in stage 1030. In some embodiments, prompting the first user to communicate with the second user may comprise prompting the first user to respond to one of the presented facilitating lines. For example, the system may present the user with an interface to select a particular facilitating line, of the one or more facilitating lines. As another example, the platform may select a particular one of the facilitating liens from the one or more presented facilitating lines. A module (e.g., the user interface module 400) may receive content entered by the first user in response to the selected one or more facilitating lines. Alternatively or additionally, the platform may accept, from the first user, a communication comprising content to be delivered to the second user. For example, the first user may type a message unrelated to the one or more facilitating lines. The platform may deliver the response from the first user to the second user.

After prompting the first user to communicate with the second user in stage 1030, the method 1000 may proceed to stage 1040, where the platform may reveal, to the first user, a portion of a user profile associated with the second user. For example, a module (e.g., the photo reveal module of the user interface module 400) may reveal, to the first user, at least a portion of a user profile associated with the second user. In some embodiments, revealing a portion of the user profile may include revealing a layer of a picture of the second user in response to initiating communication between the first user and the second user (e.g., by answering the at least one facilitating line). As another example, revealing at least a portion of the user profile may include revealing a portion of a user profile of the second user in response to initiating communication with the second user (e.g., by answering the at least one facilitating line). In some embodiments, revealing at least a portion of the user profile may include revealing a portion of personal information associated with the second user in response the first user initiating communication with the second user (e.g., by answering the at least one facilitating line). In some embodiments, the second user may select the portion of the user profile associated with the second user that is to be revealed to the first user. For example, the second user may select to reveal one or more regions of a photo based on the response to the facilitating lien from the first user.

In some embodiments, revealing at least a portion of the user profile may be performed directly in response to initiating communication between the first user and the second user (e.g., in response to transmission of first message from the first user to the second user). In some embodiments, revealing at least a portion of the user profile may be performed in response to a particular number of messages being exchanged between the first user and the second user. Alternatively, revealing at least a portion of the user profile may be performed in response to a particular time period elapsing during which the first user and the second user exchange messages.

IV. Computing Device Architecture

The Communication Facilitated Partner Matching Platform 100 may be embodied as, for example, but not be limited to, a website, a web application, a desktop application, backend application, and a mobile application compatible with a computing device 800. The computing device 800 may comprise, but not be limited to the following:

- Mobile computing device, such as, but is not limited to, a laptop, a tablet, a smartphone, a drone, a wearable, an embedded device, a handheld device, an Arduino, an industrial device, or a remotely operable recording device;
- A supercomputer, an exa-scale supercomputer, a mainframe, or a quantum computer;
- A minicomputer, wherein the minicomputer computing device comprises, but is not limited to, an IBM AS400/iSeries/System I, A DEC VAX/PDP, a HP3000, a Honeywell-Bull DPS, a Texas Instruments TI-990, or a Wang Laboratories VS Series; and
- A microcomputer, wherein the microcomputer computing device comprises, but is not limited to, a server, wherein a server may be rack mounted, a workstation, an industrial device, a raspberry pi, a desktop, or an embedded device.

Embodiments of the present disclosure may comprise a system having a central processing unit (CPU) 820, a bus 830, a memory unit 840, a power supply unit (PSU) 850, and one or more Input/Output (I/O) units. The CPU 820 coupled to the memory unit 840 and the plurality of I/O units 860 via the bus 830, all of which are powered by the PSU 850. It should be understood that, in some embodiments, each disclosed unit may actually be a plurality of such units for the purposes of redundancy, high availability, and/or performance. The combination of the presently disclosed units is configured to perform the stages any method disclosed herein.

Figure 2:
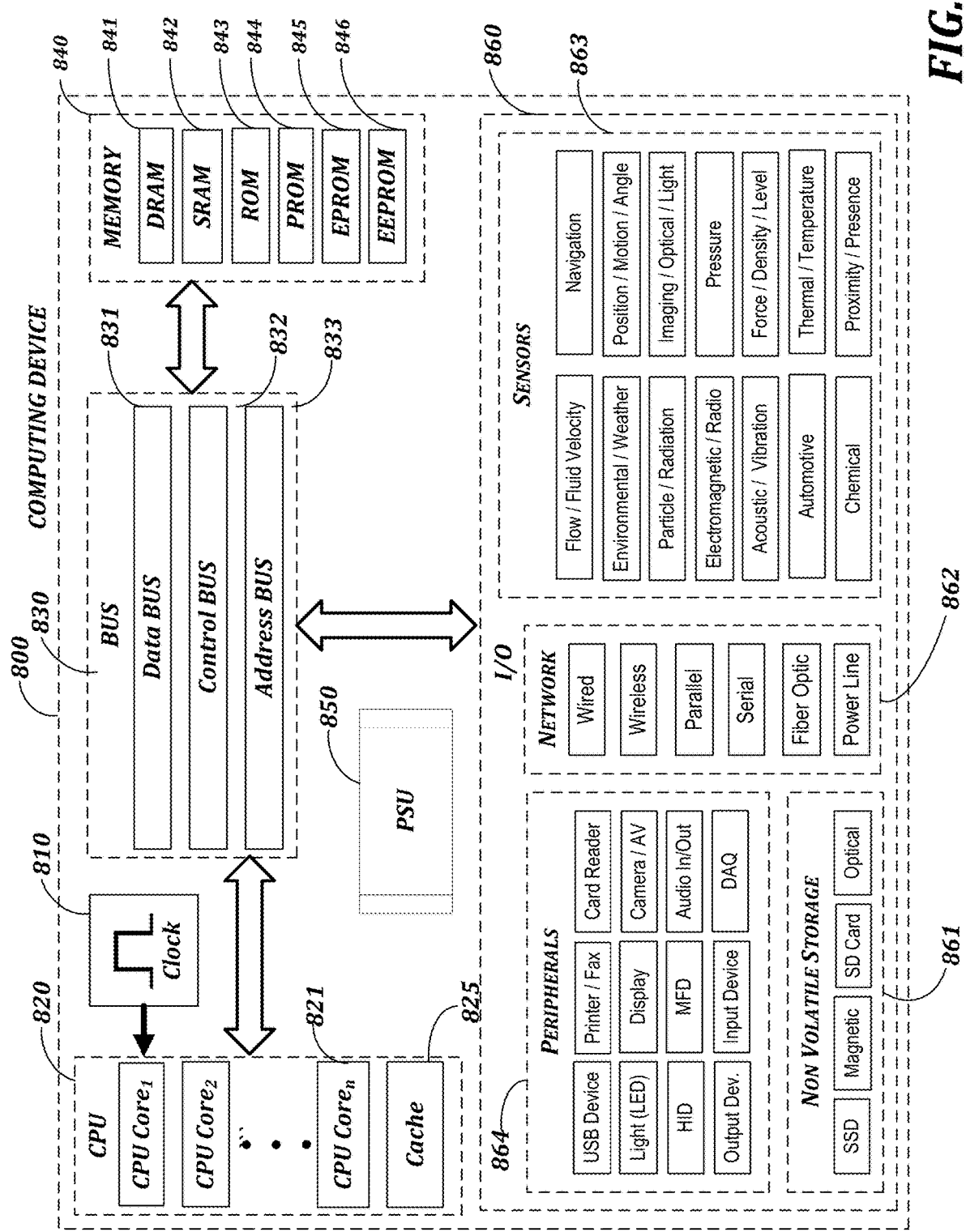
FIG. 2 is a block diagram of a system including a computing device for hosting at least a portion of a Conversation Facilitation Matching Platform.

FIG. 2 is a block diagram of a system including computing device 800. Consistent with an embodiment of the disclosure, the aforementioned CPU 820, the bus 830, the memory unit 840, a PSU 850, and the plurality of I/O units 860 may be implemented in a computing device, such as computing device 800 of FIG. 2. Any suitable combination of hardware, software, or firmware may be used to implement the aforementioned units. For example, the CPU 820, the bus 830, and the memory unit 840 may be implemented with computing device 800 or any of other computing devices 800, in combination with computing device 800. The aforementioned system, device, and components are examples and other systems, devices, and components may comprise the aforementioned CPU 820, the bus 830, the memory unit 840, consistent with embodiments of the disclosure.

At least one computing device 800 may be embodied as any of the computing elements illustrated in all of the attached figures, including the method for facilitating communication, the method for creating a profile, the method for matching users, the account creation module, the user login module, the user interface module, the notification module, the security module, and the matching rules module. A computing device 800 does not need to be electronic, nor even have a CPU 820, nor bus 830, nor memory unit 840. The definition of the computing device 800 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 800, especially if the processing is purposeful.

With reference to FIG. 2, a system consistent with an embodiment of the disclosure may include a computing device, such as computing device 800. In a basic configuration, computing device 800 may include at least one clock module 810, at least one CPU 820, at least one bus 830, and at least one memory unit 840, at least one PSU 850, and at least one I/O 860 module, wherein I/O module may be comprised of, but not limited to a non-volatile storage sub-module 861, a communication sub-module 862, a sensors sub-module 863, and a peripherals sub-module 864.

A system consistent with an embodiment of the disclosure the computing device 800 may include the clock module 810 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 820, the central component of modern computers, which relies on a clock. The only exceptions are asynchronous circuits such as asynchronous CPUs. The clock 810 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 800 use a "clock multiplier" which multiplies a lower frequency external clock to the appropriate clock rate of the CPU 820. This allows the CPU 820 to operate at a much higher frequency than the rest of the computer, which affords performance gains in situations where the CPU 820 does not need to wait on an external factor (like memory 840 or input/output 860). Some embodiments of the clock 810 may include dynamic frequency change, where, the time between clock edges can vary widely from one edge to the next and back again.

A system consistent with an embodiment of the disclosure the computing device 800 may include the CPU unit 820 comprising at least one CPU Core 821. A plurality of CPU cores 821 may comprise identical the CPU cores 821, such as, but not limited to, homogeneous multi-core systems. It is also possible for the plurality of CPU cores 821 to comprise different the CPU cores 821, such as, but not limited to, heterogeneous multi-core systems, big.LITTLE systems and some AMD accelerated processing units (APU). The CPU unit 820 reads and executes program instructions which may be used across many application domains, for example, but not limited to, general purpose computing, embedded computing, network computing, digital signal processing (DSP), and graphics processing (GPU). The CPU unit 820 may run multiple instructions on separate CPU cores 821 at the same time. The CPU unit 820 may be integrated into at least one of a single integrated circuit die and multiple dies in a single chip package. The single integrated circuit die and multiple dies in a single chip package may contain a plurality of other aspects of the computing device 800, for example, but not limited to, the clock 810, the CPU 820, the bus 830, the memory 840, and I/O 860.

The CPU unit 820 may contain cache 822 such as, but not limited to, a level 1 cache, level 2 cache, level 3 cache or combination thereof. The aforementioned cache 822 may or may not be shared amongst a plurality of CPU cores 821. The cache 822 sharing comprises at least one of message passing and inter-core communication methods may be used for the at least one CPU Core 821 to communicate with the cache 822. The inter-core communication methods may comprise, but not limited to, bus, ring, two-dimensional mesh, and crossbar. The aforementioned CPU unit 820 may employ symmetric multiprocessing (SMP) design.

The plurality of the aforementioned CPU cores 821 may comprise soft microprocessor cores on a single field programmable gate array (FPGA), such as semiconductor intellectual property cores (IP Core). The plurality of CPU cores 821 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 821, for example, but not limited to Instruction-level parallelism (ILP) such as, but not limited to, super-scalar pipelining, and Thread-level parallelism (TLP).

Consistent with the embodiments of the present disclosure, the aforementioned computing device 800 may employ a communication system that transfers data between components inside the aforementioned computing device 800, and/or the plurality of computing devices 800. The aforementioned communication system will be known to a person having ordinary skill in the art as a bus 830. The bus 830 may embody internal and/or external plurality of hardware and software components, for example, but not limited to a wire, optical fiber, communication protocols, and any physical arrangement that provides the same logical function as a parallel electrical bus. The bus 830 may comprise at least one of, but not limited to a parallel bus, wherein the parallel bus carry data words in parallel on multiple wires, and a serial bus, wherein the serial bus carry data in bit-serial form. The bus 830 may embody a plurality of topologies, for example, but not limited to, a multidrop/electrical parallel topology, a daisy chain topology, and a connected by switched hubs, such as USB bus. The bus 830 may comprise a plurality of embodiments, for example, but not limited to:

Internal data bus (data bus) 831/Memory bus
Control bus 832
Address bus 833
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.

Small Computer System Interface (SCSI)/Serial Attached SCSI (SAS)
HyperTransport
InfiniBand
RapidIO
Mobile Industry Processor Interface (MIPI)
Coherent Processor Interface (CAPI)
Plug-n-play
1-Wire
Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (i.e., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).
Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).
Music Instrument Digital Interface (MIDI)
Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, and eXtensible Host Controller Interface (xHCI).

Consistent with the embodiments of the present disclosure, the aforementioned computing device 800 may employ hardware integrated circuits that store information for immediate use in the computing device 800, know to the person having ordinary skill in the art as primary storage or memory 840. The memory 840 operates at high speed, distinguishing it from the non-volatile storage sub-module 861, which may be referred to as secondary or tertiary storage, which provides slow-to-access information but offers higher capacities at lower cost. The contents contained in memory 840, may be transferred to secondary storage via techniques such as, but not limited to, virtual memory and swap. The memory 840 may be associated with addressable semiconductor memory, such as integrated circuits consisting of silicon-based transistors, used for example as primary storage but also other purposes in the computing device 800. The memory 840 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 841, Static Random-Access Memory (SRAM) 842, CPU Cache memory 825, Advanced Random-Access Memory (A-RAM), and other types of primary storage such as Random-Access Memory (RAM).
Non-volatile memory which can retain stored information even after power is removed, for example, but not limited to, Read-Only Memory (ROM) 843, Programmable ROM (PROM) 844, Erasable PROM (EPROM) 845, Electrically Erasable PROM (EEPROM) 846 (e.g., flash memory and Electrically Alterable PROM

[EAPROM]), Mask ROM (MROM), One Time Programable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 800 may employ the communication system between an information processing system, such as the computing device 800, and the outside world, for example, but not limited to, human, environment, and another computing device 800. The aforementioned communication system will be known to a person having ordinary skill in the art as I/O 860. The I/O module 860 regulates a plurality of inputs and outputs with regard to the computing device 800, wherein the inputs are a plurality of signals and data received by the computing device 800, and the outputs are the plurality of signals and data sent from the computing device 800. The I/O module 860 interfaces a plurality of hardware, such as, but not limited to, non-volatile storage 861, communication devices 862, sensors 863, and peripherals 864. The plurality of hardware is used by the at least one of, but not limited to, human, environment, and another computing device 800 to communicate with the present computing device 800. The I/O module 860 may comprise a plurality of forms, for example, but not limited to channel I/O, port mapped I/O, asynchronous I/O, and Direct Memory Access (DMA).

Consistent with the embodiments of the present disclosure, the aforementioned computing device 800 may employ the non-volatile storage sub-module 861, which may be referred to by a person having ordinary skill in the art as one of secondary storage, external memory, tertiary storage, off-line storage, and auxiliary storage. The non-volatile storage sub-module 861 may not be accessed directly by the CPU 820 without using intermediate area in the memory 840. The non-volatile storage sub-module 861 does not lose data when power is removed and may be two orders of magnitude less costly than storage used in memory module, at the expense of speed and latency. The non-volatile storage sub-module 861 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (861) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD)

Molecular Memory

Deoxyribonucleic Acid (DNA) digital data storage

Consistent with the embodiments of the present disclosure, the aforementioned computing device 800 may employ the communication sub-module 862 as a subset of the I/O 860, which may be referred to by a person having ordinary skill in the art as at least one of, but not limited to, computer network, data network, and network. The network allows computing devices 800 to exchange data using connections, which may be known to a person having ordinary skill in the art as data links, between network nodes. The nodes comprise network computer devices 800 that originate, route, and terminate data. The nodes are identified by network addresses and can include a plurality of hosts consistent with the embodiments of a computing device 800. The aforementioned embodiments include, but not limited to personal computers, phones, servers, drones, and networking devices such as, but not limited to, hubs, switches, routers, modems, and firewalls.

Two nodes can be said are networked together, when one computing device 800 is able to exchange information with the other computing device 800, whether or not they have a direct connection with each other. The communication sub-module 862 supports a plurality of applications and services, such as, but not limited to World Wide Web (WWW), digital video and audio, shared use of application and storage computing devices 800, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 862 may comprise a plurality of size, topology, traffic control mechanism and organizational intent. The communication sub-module 862 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G, 4G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 800 may employ the sensors sub-module 863 as a subset of the I/O 860. The sensors sub-module 863 comprises at least one of the devices, modules, and subsystems whose purpose is to detect events or changes in its environment and send the information to the computing device 800. Sensors are sensitive to the measured property, are not sensitive to any property not measured, but may be encountered in its application, and do not significantly influence the measured property. The sensors sub-module 863 may comprise a plurality of digital devices and analog devices, wherein if an analog device is used, an Analog to Digital (A-to-D) converter must be employed to interface the said device with the computing device 800. The sensors may be subject to a plurality of deviations that limit sensor accuracy. The sensors sub-module 863 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (02), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 800 may employ the peripherals sub-module 862 as a subset of the I/O 860. The peripheral sub-module 864 comprises ancillary devices uses to put information into and get information out of the computing device 800. There are 3 categories of devices comprising the peripheral sub-module 864, which exist based on their relationship with the computing device 800, input devices, output devices, and input/output devices. Input devices send at least one of data and instructions to the computing device 800. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 800. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 864:

Input Devices
Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 800. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 800 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data Acquisition (DAQ) devices covert at least one of analog signals and physical parameters to digital values for processing by the computing device 800. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 862 sub-module), data storage device (non-volatile storage 861), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

Although very narrow claims are presented herein, it should be recognized the scope of this disclosure is much broader than presented by the claims. It is intended that broader claims will be submitted in an application that claims the benefit of priority from this application.

The following is claimed:

1. A method for matching users, the method comprising:
   determining profile data associated with a first user;
   processing the determined profile data based on one or more matching rules;
   determining, based at least in part on the processing, at least one second user that matches the first user;
   notifying the first user of the match;
   facilitating communication between the first user and the at least one second user; and
   responsive to the first user communicating with the at least one second user, revealing, to the first user, a portion of a user profile of the at least one second user.

2. The method of claim 1, wherein processing the determined profile data based on the one or more matching rules comprises processing the profile data based on a set of criteria configured to determine a likelihood of matching parameter among a plurality of users.

3. The method of claim 1, wherein processing the determined profile data based on the one or more matching rules comprises comparing a set of user partner preferences established by the first user to corresponding user parameters associated with each user, of a plurality of users.

4. The method of claim 3, wherein processing the determined profile data based on the one or more matching rules further comprises, for each user of the plurality of users, comparing a corresponding set of user partner preferences for the user to corresponding user parameters of the first user.

5. The method of claim 1, further comprising notifying the at least one second user of the match.

6. The method of claim 1, wherein notifying the first user of the match comprises providing to the first user, a user name associated with the at least one second user.

7. The method of claim 1, wherein facilitating communication between the first user and the at least one second user comprises transmitting a message from a first user device associated with the first user to at least one second user device associated with the at least one second user.

8. A method for facilitating communication between a first user and a second user, the method comprising:
   determining that the first user matches the second user;
   providing the first user with a list of facilitating lines from the second user;
   prompting the first user to communicate with the second user; and
   responsive to the first user communicating with the second user, revealing, to the first user, a portion of a user profile of the second user.

9. The method of claim 8, wherein prompting the first user to communicate with the second user comprises prompting the first user to respond to one of the at least one facilitating lines.

10. The method of claim 8, wherein revealing, to the first user, a portion of a user profile of the second user comprises revealing, to the first user, a portion of a picture of the second user.

11. The method of claim 8, wherein revealing, to the first user, a portion of a user profile of the second user comprises revealing, to the first user, user profile data associated with the second user.

12. The method of claim 8, wherein revealing, to the first user, a portion of a user profile of the second user comprises revealing, to the first user, one or more items of personal information of the second user.

13. The method of claim 8, further comprising providing the second user with a second list of facilitating lines from the first user, and prompting the second user to respond to at least one facilitating line from among the second list of facilitating lines.

14. The method of claim 8, wherein revealing, to the first user, the portion of the user profile of the second user is performed in response to the first user transmitting a particular number of communications to the second user.

15. The method of claim 8, wherein the revealed portion of the user profile of the second user is a portion selected by the second user.

16. A communication facilitated user matching platform comprising:
   at least one device including a hardware processor;
   the platform being configured to perform operations comprising:
   receiving, from each user, of a plurality of users, one or more user parameters and one or more user partner preferences;
   storing one or more matching rules that process, for a subset of the plurality of users, the one or more user parameters and the one or more user partner preferences to determine a first matched user and a second matched user; and
   notifying at least one of the first matched user and the second matched user of the match;
   facilitating communication between the first matched user and the second matched user; and
   responsive to the first matched user communicating with the second matched user, revealing, to the first matched user, a portion of a user profile of the second matched user.

17. The communication facilitated user matching platform of claim 16, the operations further comprising:
   storing one or more facilitating lines, and wherein facilitating the communication between the first matched user and the second matched user comprises receiving, from the first matched user, a selection of a facilitating line for transmission to the second matched user.

18. The communication facilitated user matching platform of claim 16, the operations further comprising:
   notifying at least one of the first matched user and the second matched user of the match via a short message service message.

19. The communication facilitated user matching platform of claim 16, the operations further comprising:
   determining the subset of the plurality of users for which the matching rules may process the one or more user parameters and the one or more user partner preferences.

20. The communication facilitated user matching platform of claim 16, the operations further comprising:
   creating a plurality of user accounts, corresponding to the plurality of users, based on data received from each of the plurality of users.

\* \* \* \* \*